US011863922B2

(12) United States Patent
Moon et al.

(10) Patent No.: US 11,863,922 B2
(45) Date of Patent: Jan. 2, 2024

(54) ELECTRONIC DEVICE INCLUDING ACOUSTIC MODULE

(71) Applicant: SAMSUNG ELECTRONICS CO., LTD., Suwon-si (KR)

(72) Inventors: Heecheul Moon, Suwon-si (KR); Sangyoup Seok, Suwon-si (KR); Kwonho Son, Suwon-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 17/971,733

(22) Filed: Oct. 24, 2022

(65) Prior Publication Data
US 2023/0044796 A1 Feb. 9, 2023

Related U.S. Application Data

(63) Continuation of application No. 16/861,703, filed on Apr. 29, 2020, now Pat. No. 11,483,637.

(30) Foreign Application Priority Data

Jul. 2, 2019 (KR) .................. 10-2019-0079447

(51) Int. Cl.
H04R 1/02 (2006.01)
G06F 1/16 (2006.01)
H04N 23/57 (2023.01)

(52) U.S. Cl.
CPC ............ *H04R 1/02* (2013.01); *G06F 1/1637* (2013.01); *H04N 23/57* (2023.01); *H04R 2499/11* (2013.01); *H04R 2499/15* (2013.01)

(58) Field of Classification Search
CPC .. H04R 1/02; H04R 2499/11; H04R 2499/15; H04R 1/345; H04R 1/023; G06F 1/1637;
(Continued)

(56) References Cited

U.S. PATENT DOCUMENTS 9,525,933 B2 * 12/2016 Chen .................... H04R 1/2842
9,832,565 B2 * 11/2017 Zhang .................. H04R 1/2803
(Continued)

FOREIGN PATENT DOCUMENTS

CN 109040385 12/2018
EP 1 379 101 1/2004
(Continued)

OTHER PUBLICATIONS

U.S. Appl. No. 16/861,703, filed Apr. 29, 2020; Moon et al.
(Continued)

*Primary Examiner* — Oyesola C Ojo
(74) *Attorney, Agent, or Firm* — Nixon & Vanderhye P.C.

(57) ABSTRACT

An electronic device is provided. The electronic device may include: a housing including a cover and at least one first opening; a first acoustic module comprising a speaker disposed in an internal space of the housing; and at least one path configured to guide sound signals generated by the first acoustic module to an outside, the at least one path including: a first space defined by the first acoustic module and at least a portion of the housing; a second space connecting the first space to the first opening and configured to guide a sound signal having a first frequency band toward the first opening; and a third space connecting the first space to a second opening at least partially provided between the housing and the cover and configured to guide a sound signal having a second frequency band lower than the first frequency band toward the second opening.

22 Claims, 15 Drawing Sheets

(58) Field of Classification Search
CPC .... G06F 1/1626; G06F 1/1686; G06F 1/1688; H04N 5/2257; H04M 1/026
See application file for complete search history.

(56) References Cited

U.S. PATENT DOCUMENTS

| | | | |
|---|---|---|---|
| 10,149,061 B2* | 12/2018 | Liu | H04R 9/06 |
| 10,484,766 B2* | 11/2019 | Huo | H04R 1/2811 |
| 10,701,469 B2* | 6/2020 | Park | H04R 1/2803 |
| 11,483,637 B2 | 10/2022 | Moon et al. | |
| 2005/0233781 A1 | 10/2005 | Erixon et al. | |
| 2007/0123312 A1* | 5/2007 | Friedman | H04M 1/03 379/433.02 |
| 2013/0076709 A1* | 3/2013 | Cha | G06F 1/1688 345/204 |
| 2013/0094685 A1* | 4/2013 | Seo | H04R 1/021 381/332 |
| 2013/0223655 A1* | 8/2013 | Lee | H04R 1/34 381/189 |
| 2014/0369533 A1* | 12/2014 | Kim | H04R 1/345 381/160 |
| 2015/0063595 A1* | 3/2015 | Kemppinen | H04M 1/6041 381/151 |
| 2016/0088385 A1* | 3/2016 | Fan | B29B 11/04 29/896.2 |
| 2016/0323675 A1* | 11/2016 | Dai | H04R 31/006 |
| 2017/0134848 A1* | 5/2017 | Shao | H04R 7/18 |
| 2017/0149942 A1* | 5/2017 | Lee | H04M 1/026 |
| 2017/0245032 A1* | 8/2017 | Yoon | H04R 1/345 |
| 2019/0032676 A1 | 1/2019 | Lind et al. | |
| 2019/0037293 A1 | 1/2019 | Kim | |
| 2019/0098121 A1* | 3/2019 | Jeon | G06F 1/1656 |
| 2019/0320253 A1 | 10/2019 | Park et al. | |
| 2020/0213741 A1* | 7/2020 | Shen | H04R 1/345 |

FOREIGN PATENT DOCUMENTS

| | | |
|---|---|---|
| EP | 2 573 645 A2 | 3/2013 |
| WO | WO 2018/088726 A1 | 5/2018 |

OTHER PUBLICATIONS

Extended European Search Report dated Apr. 21, 2022 for EP Application No. 20834113.1.
International Search Report and Written Opinion dated Jul. 29, 2020 in counterpart International Patent Application No. PCT/KR2020/005579.

* cited by examiner

ELECTRONIC DEVICE INCLUDING ACOUSTIC MODULE

CROSS-REFERENCE TO RELATED APPLICATION

This application is a Continuation of U.S. application Ser. No. 16/861,703, filed Apr. 29, 2020 (U.S. Pat. No. 11,483,637), which claims priority to Korean Patent Application No. 10-2019-0079447, filed on Jul. 2, 2019, the disclosures of which are all incorporated by reference herein in their entireties.

BACKGROUND

Field

The disclosure relates to an electronic device including an acoustic module.

Description of Related Art

As the functional gap between manufacturers is significantly reduced, electronic devices are becoming slimmer to meet consumer's purchasing needs. Also, electronic devices are being upgraded by increasing rigidity, enhancing design aspects, and differentiating their functional elements.

In order to make an electronic device slim, a plurality of electronic components must be efficiently arranged in the internal space of the electronic device. Efficient arrangement of electronic components in the internal space of the electronic device also means that their functions are fully exhibited. Otherwise, the quality of the electronic device may be degraded. In particular, the electronic components disposed around the large screen display may require an efficient arrangement structure inside the electronic device.

Electronic devices are being improved by expanding the display area compared to other electronic devices of the same size. For example, the display is designed to substantially occupy most of the front of the electronic device, and peripheral electronic components such as a camera module or acoustic module (e.g., speaker module or microphone module) are designed to have a corresponding arrangement structure. Specifically, the camera module may be disposed under the display in the internal space of the electronic device and may perform its function through the camera exposure region disposed in the active area of the display. In addition, the speaker module may be arranged to emit sound through an opening between the cover member (e.g., front cover or glass window) on which the display is disposed and the housing (e.g., side member) from the sound transmission path disposed in the internal space of the electronic device. This opening may be finished with a decorative or protective member for preventing and/or reducing introduction of foreign substances and to improve an aesthetic appearance.

However, when the decorative member is applied, it is necessary to implement the height up to the outer surface of the cover member, which may obstruct the reduction of the upper black matrix (BM). Further, in a situation where the size of the opening through which sound is emitted is to be reduced for the expansion of the display area, the decorative member may obstruct the reduction of the opening. Here, the sound quality may be degraded by the gradually decreasing opening. In addition, when a sharp tool is used through the opening to remove a foreign substance, the periphery of the display disposed on the back of the cover member may be damaged, which may cause malfunction of the electronic device.

SUMMARY

According to various example embodiments of the disclosure, provided an electronic device is provided. The electronic device may include: a housing including a cover and at least one first opening; a first acoustic module comprising a speaker disposed in an internal space of the housing; and at least one path configured to guide sound signals generated by the first acoustic module to the outside, the at least one path including: a first space defined by the first acoustic module and at least a portion of the housing; a second space connecting the first space to the first opening and configured to guide a sound signal having a first frequency band toward the first opening; and a third space connecting the first space to a second opening at least partially provided between the housing and the cover and configured to guide a sound signal having a second frequency band lower than the first frequency band toward the second opening.

According to various example embodiments of the disclosure, an electronic device is provided. The electronic device may include: a housing including a cover; a display disposed in an internal space of the housing and being at least partially visible from the outside through the cover; an acoustic module comprising a speaker disposed in the internal space; at least one path configured to guide sound signals generated by the acoustic module to the outside, the at least one path including: a first space defined by the acoustic module and at least a portion of the housing; and a second space connecting the first space to an opening at least partially provided between the housing and the cover; and a dummy projection protruding from the housing toward the display in the second space, wherein the dummy projection may be arranged to at least partially overlap the cover when the cover is viewed from above.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, embodiments of the disclosure are described in greater detail with reference to accompanying drawings.

Figure 1:
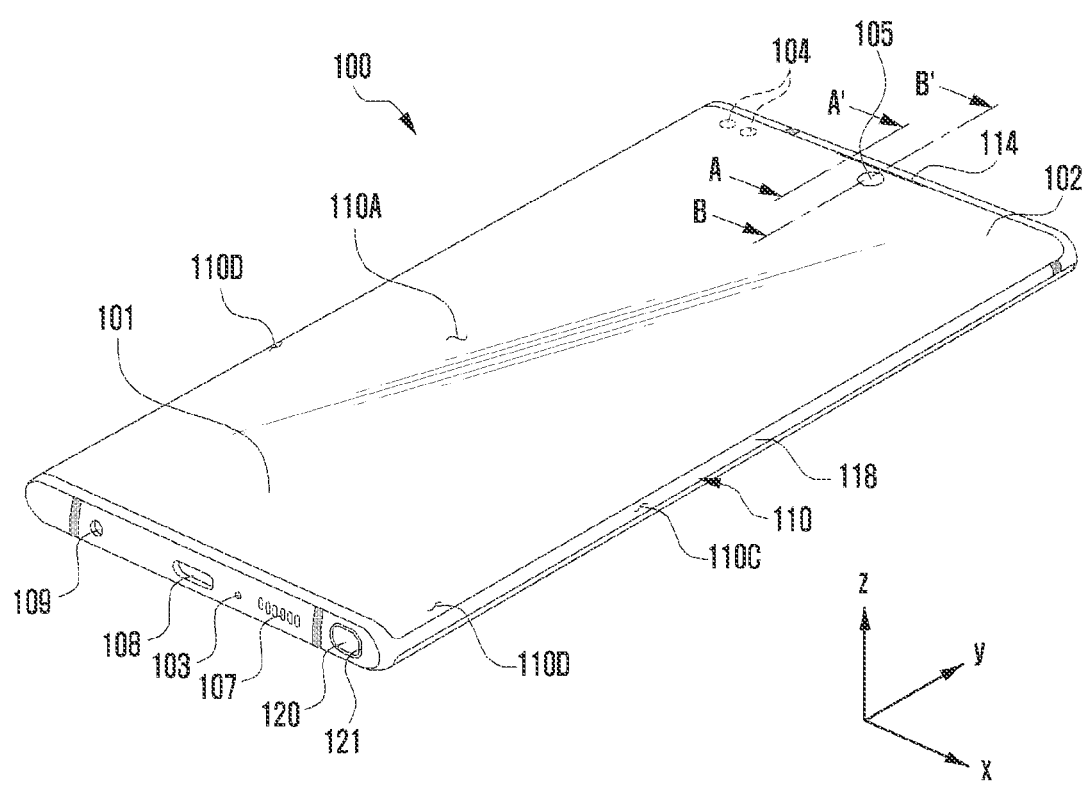
FIG. 1 is a front perspective view illustrating an example mobile electronic device according to various embodiments of the disclosure.
Figure 2:
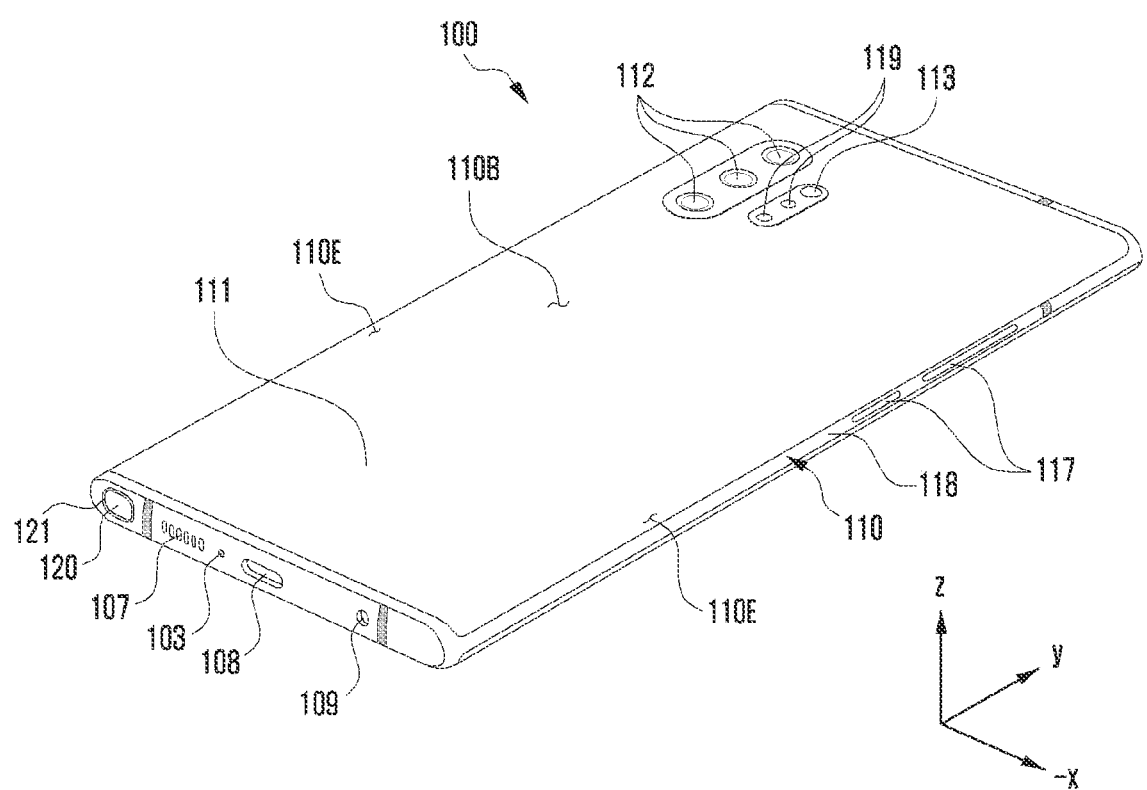
FIG. 2 is a rear perspective view of the electronic device of FIG. 1 according to various embodiments of the disclosure.

FIG. 1 is a front perspective view illustrating an example electronic device according to an embodiment of the disclosure, and FIG. 2 is a rear perspective view of the example electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor (not shown), and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

The pen input device 120 (e.g., stylus pen or electronic pen) may be guided and inserted into or detached from the housing 110 through a hole 121 formed at a side surface of the housing 110, and may include a button to facilitate the detachment. The pen input device 120 may include a separate resonant circuit to interoperate with an electromagnetic induction panel 390 (e.g., digitizer) included in the electronic device 100. The pen input device 120 may utilize an electro-magnetic resonance (EMR) scheme, an active electrical stylus (AES), or an electric coupled resonance (ECR) scheme.

Some sensor modules 105 of camera modules 105 and 212, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

Figure 3:
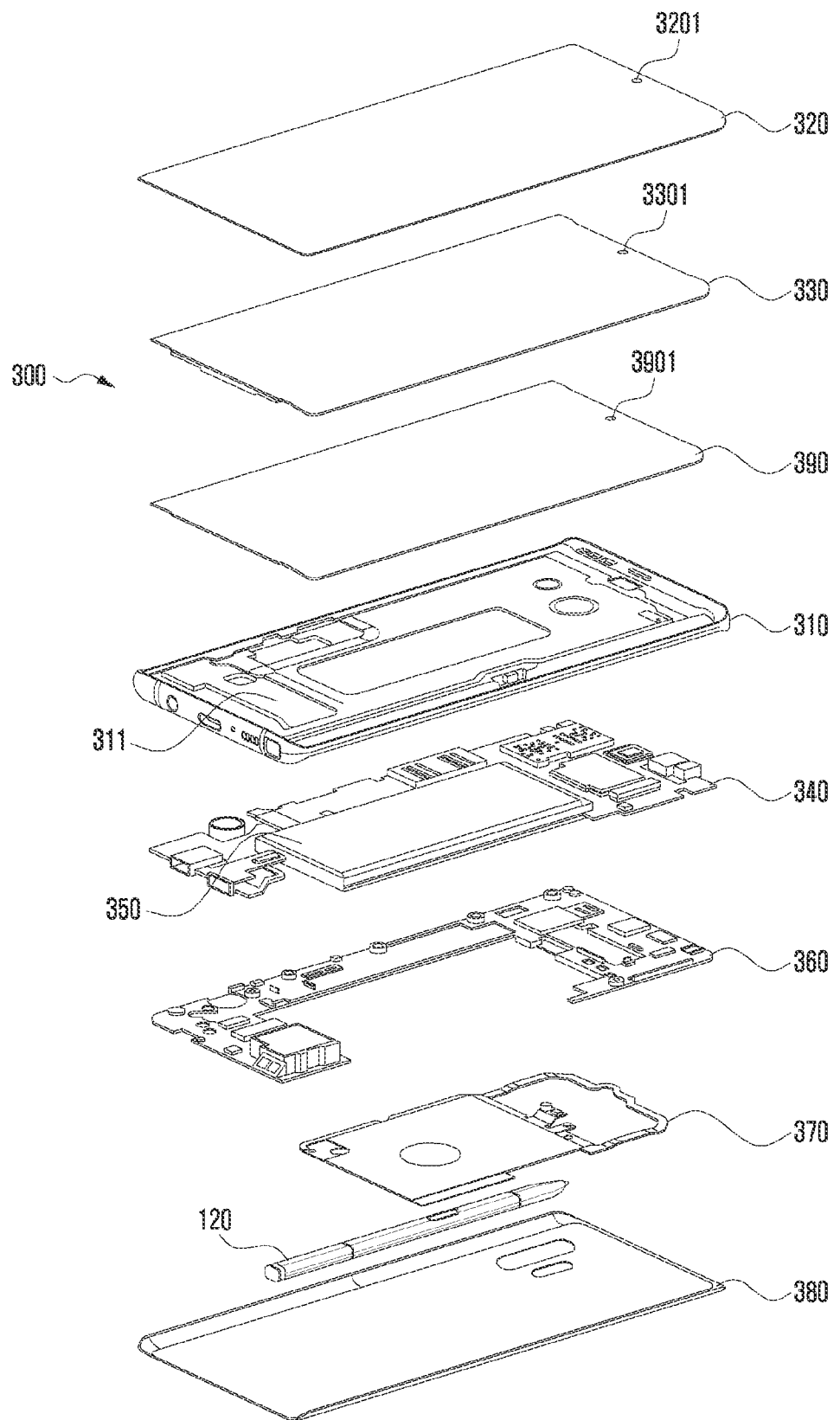
FIG. 3 is an exploded perspective view of the electronic device of FIGS. 1 and 2 according to various embodiments of the disclosure.

FIG. 3 is an exploded perspective view illustrating the example mobile electronic device shown in FIG. 1 according to an embodiment of the disclosure.

Referring to FIG. 3, a mobile electronic device 300 may include a lateral bezel structure 310, a first support member 311 (e.g., a bracket), a front plate 320, a display 400, an electromagnetic induction panel (390), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The electromagnetic induction panel 390 (e.g., digitizer) may be a panel for sensing an input of the pen input device 120. For example, the electromagnetic induction panel 390 may include a printed circuit board (PCB) (e.g., flexible printed circuit board (FPCB)) and a shielding sheet. The shielding sheet may prevent interference between components (e.g., display module, printed circuit board, and electromagnetic induction panel) included in the electronic device 100 caused by electromagnetic fields generated by the components. The shielding sheet may block electromagnetic fields generated from the components so that the input from the pen input device 120 is accurately transmitted to the coil included in the electromagnetic induction panel 240. In various embodiments, the electromagnetic induction panel 390 may include an opening formed in at least a region corresponding to the biometric sensor mounted in the electronic device 100.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 400 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

In various embodiments, the camera module (e.g., camera module 105 in FIG. 1) may be disposed between the first support member 311 and the rear plate 380. In an example embodiment, the camera module 105 may be disposed to protrude or be exposed toward the front plate 320 through a through hole (not shown) formed in the first support member 311. In an example embodiment, the camera module 105 may be arranged to face the camera exposure zone 3201 of the front plate 320 through a through hole 3301 formed at the corresponding position of the display panel 330 and a through hole 3901 formed at the corresponding position of the electromagnetic induction panel 390. In another embodiment, the display panel 330 may face the camera module 105 through a zone having a high transmittance formed by a change in the pixel structure and/or a wiring structure without having a through hole at the corresponding position.

Figure 4:
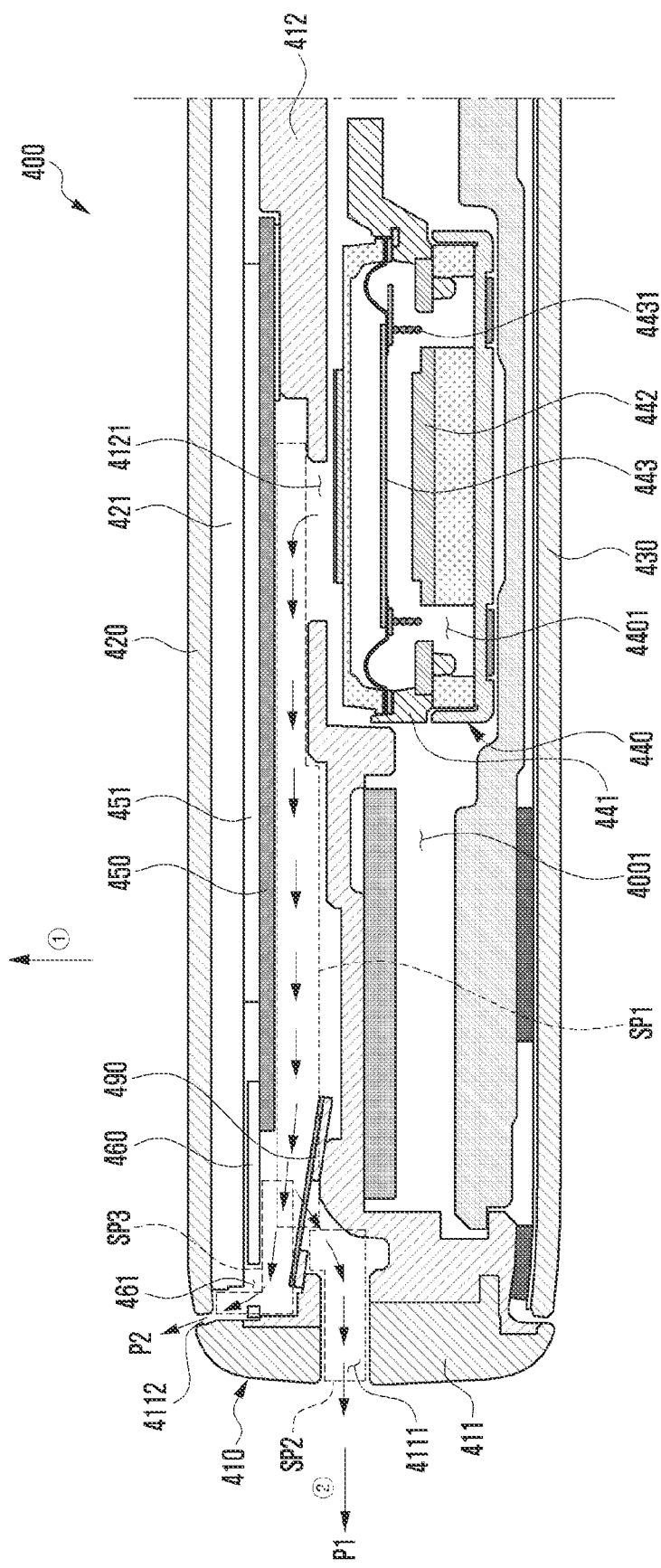
FIG. 4 is a partial cross-sectional view illustrating the example electronic device taken along the line A-A' of FIG. 1 according to various embodiments of the disclosure.

FIG. 4 is a partial cross-sectional view illustrating the example electronic device 400 taken along the line A-A' of FIG. 1 according to various embodiments of the disclosure.

The electronic device 400 of FIG. 4 may include at least some embodiments similar to or different from those of the electronic device 100 of FIG. 1 or the electronic device 300 of FIG. 3.

With reference to FIG. 4, the electronic device 400 may include a front cover 420 (e.g., front plate 102 in FIG. 1) facing a first direction (① direction), a rear cover 430 (e.g., rear plate 111 in FIG. 2) facing away from the front cover 420, and a housing structure 410 (e.g., housing 110 in FIG. 1) including a side member 411 (e.g., side bezel structure 118 in FIG. 1) surrounding a space 4001 between the front cover 420 and the rear cover 430. In another embodiment, a support member 412 may be disposed through structural coupling with the side member 411. In an example embodiment, the electronic device 400 may include a display 421 (e.g., display 101 in FIG. 1) disposed on the rear surface of the front cover 420 configured to be at least partially visible from the outside through the front cover 420.

In various embodiments, the electronic device 400 may include a speaker module (e.g., including a speaker) 440 disposed in the internal space. In an example embodiment, the speaker module 440 may be disposed in a space between the support member 412 and the rear cover 430. In an example embodiment, the speaker module 440 may include a speaker housing 441, at least one magnet 442 disposed in the internal space 4401 of the speaker housing 441, a coil member 4431 (e.g., voice coil) disposed at a position affected by the magnetic force of the at least one magnet 442, and a diaphragm 443 at least partially fixed to the speaker housing 441 so as to vibrate in accordance with the movement of the coil member 4431. In another embodiment, the speaker module 440 may be disposed in a space between the support member 412 and the front cover 420. In an example embodiment, the acoustic signal emitted by the speaker module 440 may pass through the first through-hole 4121 formed at the support member 412, pass through the path for sound transmission provided in the internal space 4001 of the electronic device 400, and be discharged to the outside of the electronic device 400.

In an example embodiment of the disclosure, the path for sound transmission may have an acoustic branch structure in which one sound transmission path is divided into a first path P1 for mainly transmitting a sound signal of a first frequency band with relatively high frequencies and a second path P2 for mainly transmitting a sound signal of a second frequency band lower than the first frequency band. In an example embodiment, the sound signal of the first frequency band may be emitted through a substantially linear acoustic path (e.g., acoustic duct) and a relatively large first opening 4111 formed in the side member 411 due to high frequency characteristics. In an example embodiment, the sound signal of the second frequency band may be emitted through a curved acoustic path (e.g., acoustic duct) and a relatively small second opening 4112 between the side member 411 and the front cover 420 due to low frequency characteristics. In an example embodiment, the sound signal of the first frequency band may include frequencies in the range of, for example, about 800 Hz to 10000 Hz. In an example embodiment, the sound signal of the first frequency band may include frequencies in the range of, for example, about 8000 Hz to 10000 Hz. In an example embodiment, the sound signal of the second frequency band may include frequencies in the range of, for example, 800 Hz or less.

In various example embodiments of the disclosure, through the acoustic branch structure according to the frequency band, the electronic device may prevent and/or reduce degradation of the high-pitched sound performance due to a single sound emission opening (e.g., second opening 4112) that dwindles gradually, and may prevent and/or reduce sound quality degradation by guiding high-pitched sounds through another opening (e.g., first opening 4111) for high-pitched sound emission.

In various embodiments, the path for sound transmission may include a first space SP1 (e.g., first acoustic channel or first acoustic path) formed in the internal space 4001 of the electronic device 400 and connected to the first through hole 4121, a second space SP2 (e.g., second acoustic channel or second acoustic path) extending from the first space SP1 and connected to the first opening 4111 formed in the side member 411, and a third space SP3 (e.g., third acoustic channel or third acoustic path) extending from the first space SP1 and connected to the second opening 4112 formed between the side member 411 and the front cover 420. In an example embodiment, the first space SP1, the second space SP2, and the third space SP3 may be connected to each other. In an example embodiment, the first space SP1, the second space SP2, and the third space SP3 may be formed by changing the structural configuration of the side member 411 and/or the support member 412. In an example embodiment, although the first space SP1, the second space SP2, and the third space SP3 are shown as being divided by region in the internal space 4001 of the electronic device 400 for ease of description, these spaces may include one connected acoustic path or acoustic channel. In another embodiment, the first space SP1, the second space SP2, and the third space SP3 may be formed through the coupling and/or arrangement structure of the side member 411, the support member 412 and/or the speaker module 440. In an example embodiment, the first space SP1 may be formed through the first cover 450 coupled to the support member 412 in the internal space 4001 of the electronic device 400. In an example embodiment, the third space SP3 may be formed through the second cover 460 coupled to the side member 411 and/or the support member 412 in the internal space 4001 of the electronic device 400. In an example embodiment, the second cover 460 may include a plurality of sound emission holes 461 through which a sound signal passes. In an example embodiment, the support cover 451 may be additionally disposed between the first cover 450 and the display 421.

In various embodiments, the sound signal of the relatively high first frequency band generated by the speaker module 440 may be emitted to the outside of the electronic device 400 through the first path P1, which includes the first through hole 4121 formed in the support member 412, the first space SP1 connected to the first through hole 4121, the second space SP2 connected to the first space SP1, and the first opening 4111 connected to the second space SP2. In an example embodiment, the sound signal passing through the first path P1 may be emitted in the direction that the side member 411 faces (② direction). In an example embodiment, the sound signal of the relatively low second frequency band generated by the speaker module 440 may be emitted to the outside of the electronic device 400 through the second path P2, which includes the first through hole 4121 formed in the support member 412, the first space SP1 connected to the first through hole 4121, the third space SP3 connected to the first space SP1, and a second opening 4112 connected to the third space SP3 and at least partially formed using the space between the front cover 420 and the side member 411. In an example embodiment, the sound signal passing through the second path P2 may be generally emitted in a direction that the front cover 420 faces (C) direction). In another embodiment, the second opening 4112 may be formed to face a direction slightly different from the direction that the front cover 420 faces by changing the structural configuration of the side member 411 and/or the front cover 420.

In various embodiments, the electronic device 400 may include a separation member 490 to spatially separate the first space SP1 and the second space SP2. In an example embodiment, the separation member 490 may be disposed between the first space SP1 and the second space SP2 in a manner of being attached to the side member 411 and/or the support member 412. In an example embodiment, the separation member 490 may prevent and/or reduce moisture or foreign substances introduced through the first opening 4111 from entering into the inside of the electronic device 400. In an example embodiment, the separation member 490 may include, for example, and without limitation, at least one of a mesh, a nonwoven fabric, a membrane, or the like. In an example embodiment, the separation member 490 may be attached to the side member 411 and/or the support member 412 using, for example, and without limitation, at least one of double sided tape, rubber, urethane, silicone, or the like. In an example embodiment, the separation member 490 may block external moisture and may emit the sound signal passing through the first path P1 to the outside through the first opening 4111.

In various embodiments, the first opening 4111 may be formed as at least one through hole penetrating the side member 411. In an example embodiment, the first opening 4111 may be formed as a single hole of a slot-hole shape having a length including all through holes. In an example embodiment, the first opening 4111 may be formed in parallel with the front cover 420 from the outer surface to the inner surface of the side member 411. In another embodiment, the first opening 4111 may be formed to be inclined with a preset angle with the front cover 420. For example, the first opening 4111 may be inclined downward or inclined upward from the horizontal direction. This may be advantageous for attaching the separation member 490 and changing the sound emission direction.

Figure 5A:
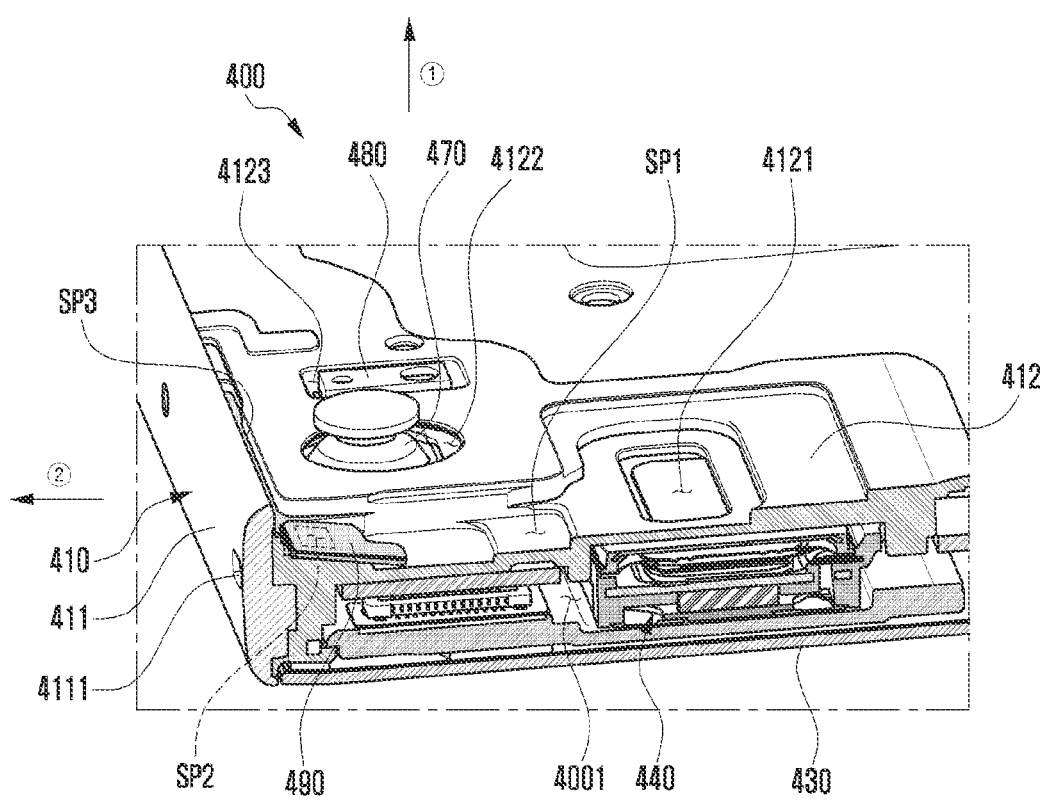
FIGS. 5A and 5B are perspective views of a partial cross-section of the example electronic device before and after cover members are arranged to form a path for sound transmission according to various embodiments of the disclosure.
Figure 5B:
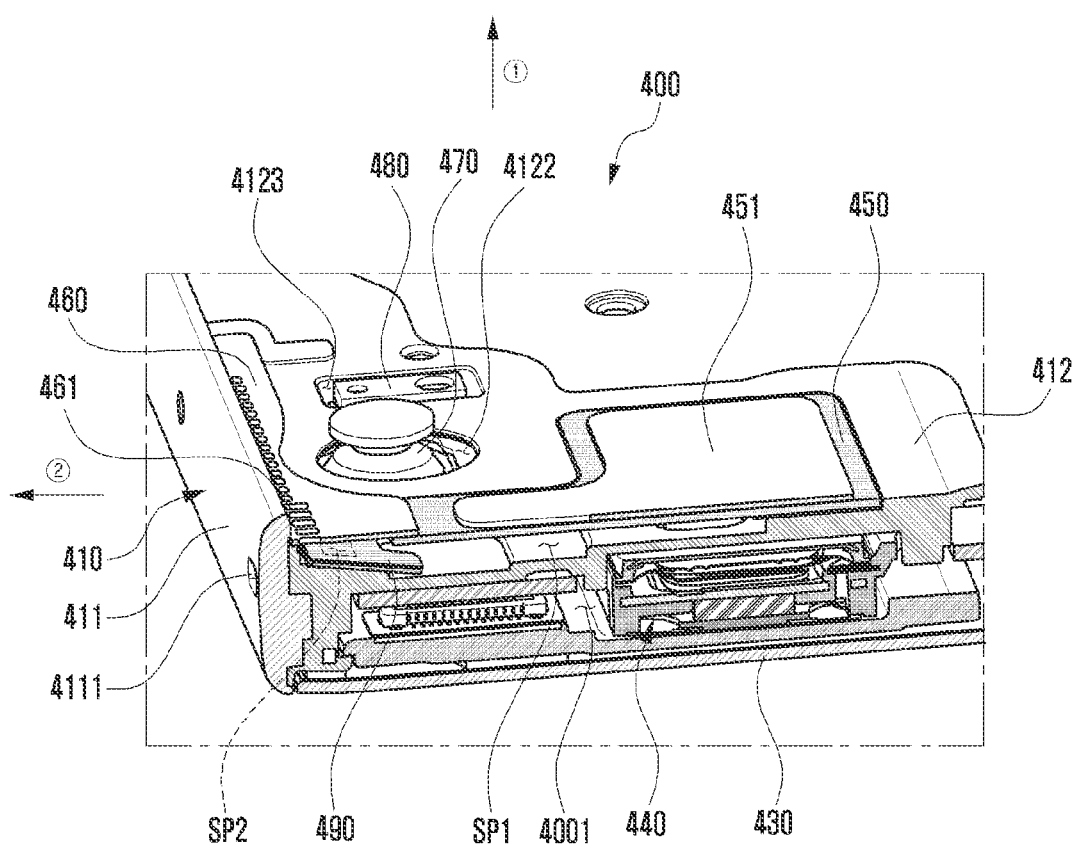

FIGS. 5A and 5B are perspective views of a partial cross-section of the example electronic device 400 before and after the cover members 450 and 460 are arranged to form a path for sound transmission according to various embodiments of the disclosure.

With reference to FIGS. 5A and 5B, the electronic device 400 may emit the sound signal generated by the speaker module 440 disposed in the internal space 4001 to the outside through two paths (e.g., first path P1 and second path P2 in FIG. 4). In an example embodiment, the electronic device 400 may emit a sound signal of the first frequency band for relatively high-pitched sounds to the first opening 4111 through the first space SP1 and the second space SP2 connected to the first space SP1. In an example embodiment, the electronic device 400 may emit a sound signal of the second frequency band for relatively low-pitched sounds to the second opening 4112 through the first space SP1 and the third space SP3 connected to the first space SP1.

In various embodiments, the first space SP1 may be formed through the support member 412 and the first cover 450 disposed above the support member 412. In an example embodiment, the second space SP2 may be formed by changing the configuration of the side member 411 and the support member 412, and may be connected to the first space SP1. In an example embodiment, the third space SP3 may be formed through the side member 411 and/or the second cover 460 disposed above the support member 412. In an example embodiment, the second cover 460 may include a plurality of sound emission holes 461 formed to transmit sounds to the second opening 4112. In an example embodiment, the electronic device 400 may further include a support cover 451 disposed between the display 421 and the first cover 450. In an example embodiment, the support cover 451 may support the rear surface of the display 421 from the first cover 450 and, when the second cover 460 is stacked on at least a portion of the first cover 450, it may perform a step compensation function to compensate for the thickness of the second cover 460 and may also function as an adhesive member attached to the back of the display. In an example embodiment, the first cover 450, the second cover 460, and/or the support cover 451 may include, for example, and without limitation, at least one of a metal material or a polymer material, and may be attached to at least a portion of the side member 411 and/or at least a portion of the support member 412 through an attachment process such as bonding, taping or fusion.

In various embodiments, the electronic device 400 may include at least one electronic component capable of performing its function with or without being exposed through the front cover 420. In an example embodiment, the at least one electronic component may include a camera module 470 and a sensor module 480 (e.g., time-of-flight (TOF) module) disposed substantially at the top center when the front cover 420 is viewed from above. In an example embodiment, the sensor module 480 may include, for example, and without limitation, at least one of a TOF sensor, an illuminance sensor, an ultrasonic sensor, an iris recognition sensor, or the like. In an example embodiment, the camera module 470 may be disposed between the support member 412 and the rear cover 430 in the internal space 4001 so as to face in the direction of the front cover through the second through hole 4122 formed in the support member 412. In an example embodiment, the camera module 470 may be disposed to face the camera exposure zone (e.g., camera exposure zone 3201 in FIG. 3) of the front cover 420 through a through hole (e.g., through hole 3301 in FIG. 3) formed in the display 421. In an example embodiment, the sensor module 480 may also be disposed to face the display 421 through the third through hole 4123 formed in the support member 412 while being supported by the support member 412 in the space between the support member 412 and the rear cover 430. In another embodiment, the camera module 470 may be disposed to be close to the rear surface of the display 421 (e.g., display panel 330 in FIG. 3) where no through hole is formed. In this case, the corresponding portion of the display facing the camera module 470 may be formed to have a high transmittance through a change in the pixel structure and/or the wiring structure.

According to an example embodiment of the disclosure, the speaker module 440 may be disposed around at least one electronic component (e.g., camera module). In this case, at least some of the first space SP1, the second space SP3, and/or the third space SP3 may be arranged to be adjacent to the least one electronic component. In another embodiment, at least some of the first space SP1, the second space SP3, and/or the third space SP3 may be formed by bypassing the at least one electronic component. In another embodiment, at least some of the first space SP1, the second space SP3, and/or the third space SP3 may be arranged to be aligned with or in parallel with the at least one electronic component.

Figure 6A:
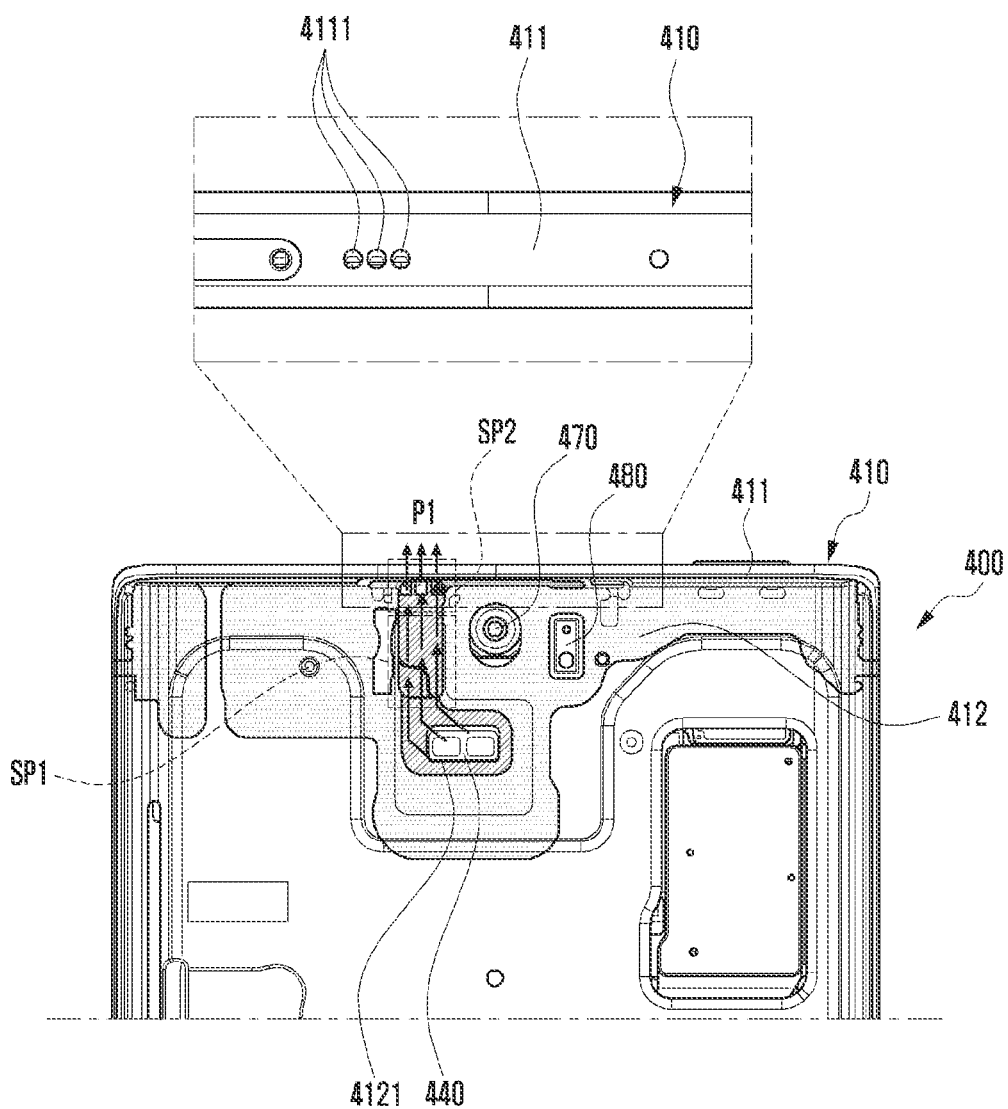
FIG. 6A is a partial view of the example electronic device illustrating a sound transmission path using a first space and a second space according to various embodiments of the disclosure.
Figure 6B:
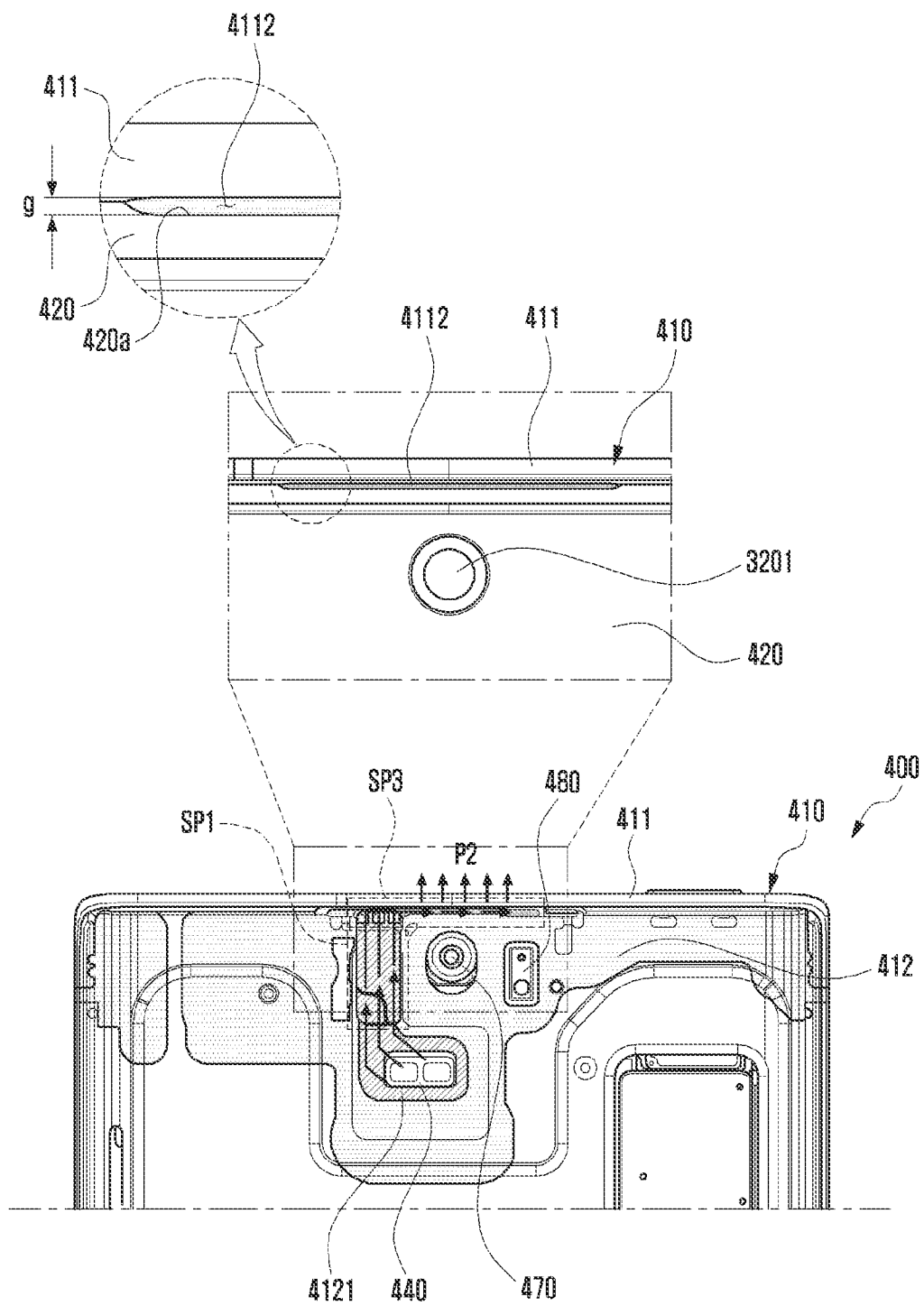
FIG. 6B is a partial view of the example electronic device illustrating a sound transmission path using a first space and a third space according to various embodiments of the disclosure.

FIG. 6A is a partial view of the example electronic device illustrating a sound transmission path P1 using the first space SP1 and the second space SP2 according to various embodiments of the disclosure. FIG. 6B is a partial view of the example electronic device illustrating a sound transmission path P2 using the first space SP1 and the third space SP3 according to various embodiments of the disclosure.

With reference to FIG. 6A, the electronic device 400 may include a camera module 470 disposed through the support member 412 in the upper center, and a sensor module 480 disposed around the camera module 470. In an example embodiment, the electronic device 400 may include a speaker module 440 disposed around the camera module 470 and/or the sensor module 480. In an example embodiment, the electronic device 400 may emit a sound signal of a relatively high first frequency band generated by the speaker module 440 to the outside thereof through the first path P1, which includes the first through hole 4121 formed in the support member 412, the first space SP1 connected to the first through hole 4121, the second space SP2 connected to the first space SP1, and the first opening 4111 connected to the second space SP2.

With reference to FIG. 6B, the electronic device 400 may emit a sound signal of the relatively low second frequency band generated by the speaker module 440 to the outside thereof through the second path P2, which includes the first through hole 4121 formed in the support member 412, the first space SP1 connected to the first through hole 4121, the third space SP3 connected to the first space SP1, and a second opening 4112 connected to the third space SP3 and at least partially formed using the space between the front cover 420 and the side member 411.

In various embodiments, the first path P1 and the second path P2 may be arranged by bypassing the camera module 470 and/or the sensor module 480 disposed therearound. This is because the second opening 4112, which is used to emit a sound passing through the second path P2, is disposed at the upper center of the electronic device 400 and may be used as a receiver for receiving a voice of the other party during a call.

According to an example embodiment of the disclosure, the electronic device 400 includes an acoustic branch structure in which high-pitched sounds and low-pitched sounds are separately emitted. The gap g for sound emission between the side member 411 and the recess 420a formed at the periphery of the front cover 420, corresponding to the second opening 4112 used as a receiver, is set to a small (e.g., minimum) value (e.g., about 0.1 mm). This may help to reduce the BM region of the display 421 and to expand the active region. In addition, the acoustic branch structure for separating high-pitched sounds and low-pitched sounds can help to produce high quality sound.

Figure 7:
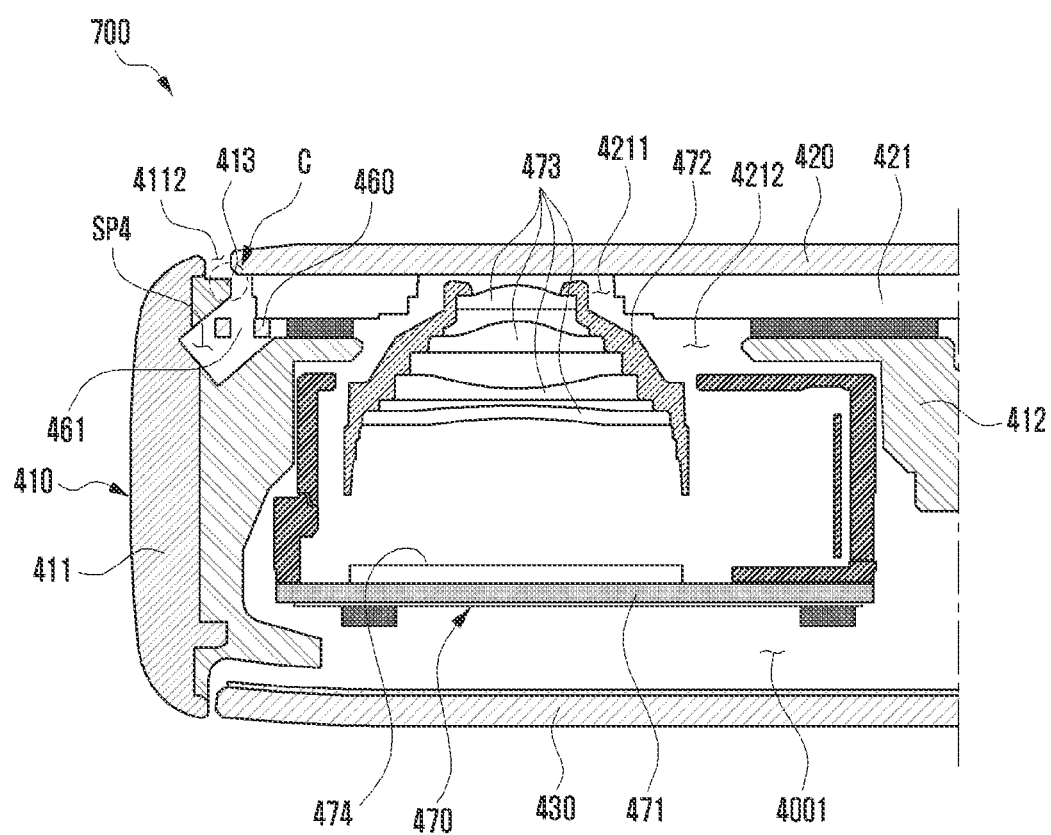
FIG. 7 is a partial cross-sectional view of the example electronic device taken along the line B-B' of FIG. 1 according to various embodiments of the disclosure.

FIG. 7 is a partial cross-sectional view of the example electronic device 700 taken along the line B-B' of FIG. 1 according to various embodiments of the disclosure.

The electronic device 700 of FIG. 7 may further include at least some embodiments similar to or different from those of the electronic device 100 of FIG. 1, the electronic device 300 of FIG. 3, or the electronic device 400 of FIG. 4.

In the description on the electronic device 700 of FIG. 7, components substantially the same as those of the electronic device 400 of FIG. 4 are denoted by the same reference numerals, and a detailed description thereof may not be repeated here.

With reference to FIG. 7, the electronic device 700 may include a camera module 470 disposed in the internal space 4001 of the housing structure 410. In an example embodiment, the camera module 470 may include a camera housing 471 disposed to be supported by the support member 412, a body tube member 472 (e.g., lens housing) that is disposed to project from the camera housing 471, penetrate the second through hole 4212 formed in the support member (412), and face the front cover 420 by being at least partially penetrated by the through hole 4211 (e.g., through hole 3301 in FIG. 3) formed in the display 421, a plurality of lenses 473 disposed in the body tube member 472, and at least one image sensor 474 disposed to be aligned with the center of the lenses 473 in the camera housing 471.

In various embodiments, the electronic device 700 may include a protruding dummy 413 projecting (e.g., dummy projection) from the side member 411 toward the display 421 to prevent and/or reduce damage to the display 421 by, for example, a sharp tool introduced through the second opening 4112. In an example embodiment, the protruding dummy projection 413 may have substantially the same length as the second opening 4112. In another embodiment, the protruding dummy 413 may include plural dummies spaced apart at regular intervals within the length of the second opening 4112. In an example embodiment, the protruding dummy 413 may be formed to protrude to at least partially overlap one end of the front cover 420 when the front cover 420 is viewed from above. In an example embodiment, the protruding dummy 413 may be arranged side by side with one end of the front cover 420 without an overlap when the front cover 420 is viewed from above. For example, the protruding dummy 413 may protrude toward the display 421 such that the gap with the front cover 420 (e.g., gap d in FIG. 8) maintains a small (e.g., minimum) value (e.g., 0.1 mm) permitting a sound signal to be transmitted. In an example embodiment, the electronic device 700 may include a fourth space SP4 extending from the first space (e.g., first space SP1 in FIG. 4) that allows a sound signal to be emitted through the second opening 4112. In an example embodiment, to address the difficulty of forming the space in the vertical direction due to the formation of the protruding dummy 413 and to facilitate the processability, the fourth space SP4 may be inclined toward the inside of the side member 411 and have a preset depth in an diagonal direction. In an example embodiment, the fourth space SP4 may be replaced with the third space SP3 of FIG. 4 or may function as a separate space connected to the third space SP3.

In various embodiments, the electronic device 700 may include a second cover 460 disposed to at least partially shield the fourth space SP4. In an example embodiment, the second cover 460 may be disposed below the protruding dummy 413. In an example embodiment, the second cover 460 may be disposed below the display 421 in the fourth space SP4, helping to reduce the BM region of the display 421. In addition, the protruding dummy 413 at least partially overlapping the front cover 420 may prevent and/or reduce damage to the display 421 by, for example, a sharp tool introduced from the outside.

Figure 8:
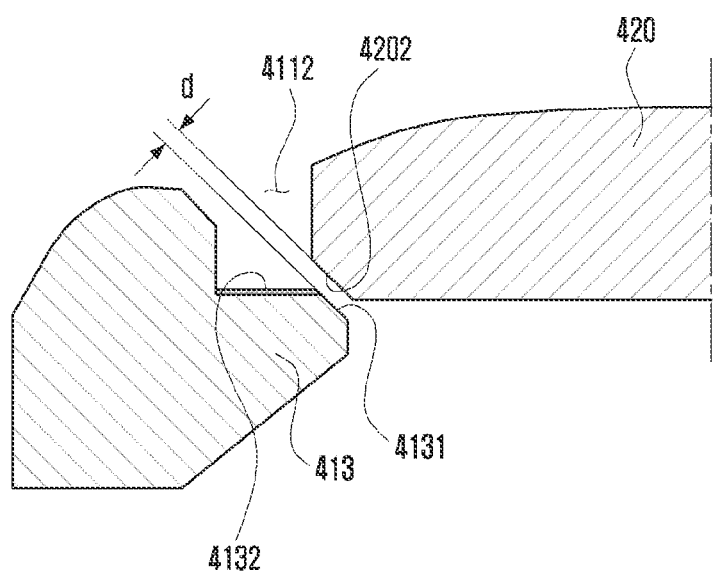
FIG. 8 is an enlarged view of zone C shown in FIG. 7 according to various embodiments of the disclosure.

FIG. 8 is an enlarged view of zone C shown in FIG. 7 according to various embodiments of the disclosure.

With reference to FIG. 8, the protruding dummy 413 is processed so that the first corresponding surface 4131 thereof may face the edge portion of the front cover 420 while maintaining a minimum gap d for sound emission, preventing and/or reducing damage to the front cover 420 due to external impact. For example, the first corresponding surface 4131 may be formed in a shape (e.g., planar cut shape or curved cut shape) corresponding to the second corresponding surface 4202 of the front cover 420.

In various embodiments, the protruding dummy 413 may include a light absorbing structure formed at a portion that can be viewed through the second opening 4112 from the outside. This may help to prevent and/or reduce recognizing of the second opening 4112 owing to a phenomenon that the light incident from the outside is reflected by the protruding dummy. In an example embodiment, the light absorbing structure may include an anti-reflective (AR) coating layer 4132 formed on at least some of the protruding dummy 413. In an example embodiment, the anti-reflective coating layer 4132 may further include a black resin layer. In another embodiment, the light absorbing structure may include a diffuse reflection layer on the surface of the protruding dummy 413 to reduce the reflectance by increasing the surface roughness through, for example, molding or processing.

Figure 9A:
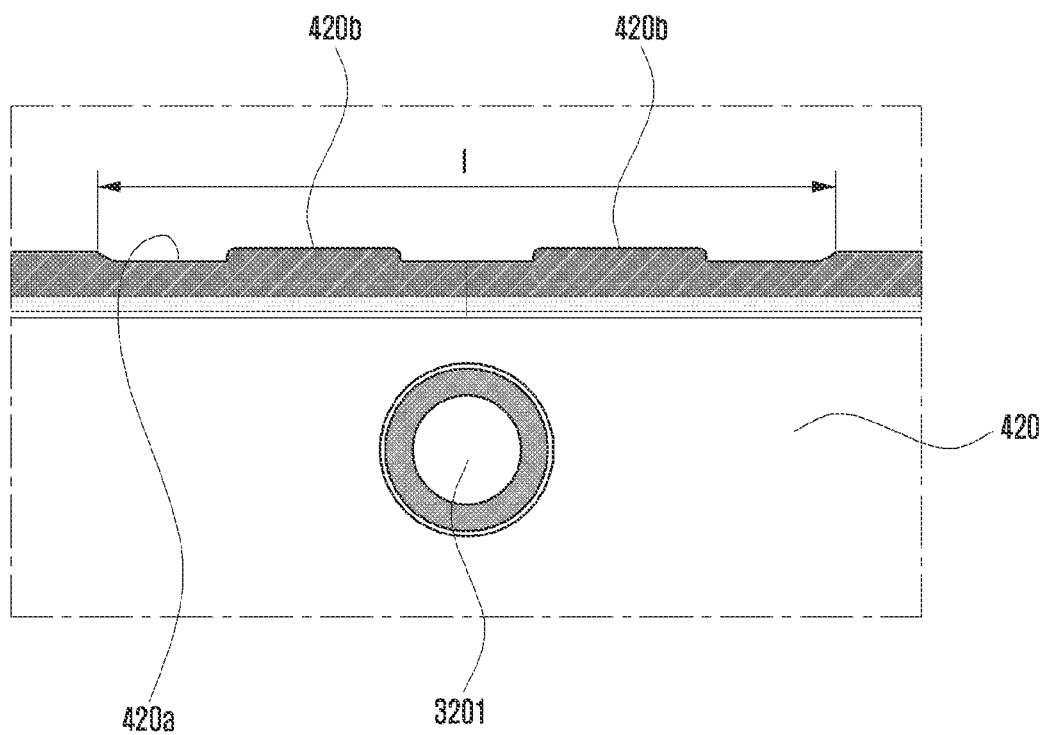
FIGS. 9A and 9B are diagrams illustrating the shape of a recess in the cover member corresponding to the opening according to various embodiments of the disclosure.
Figure 9B:
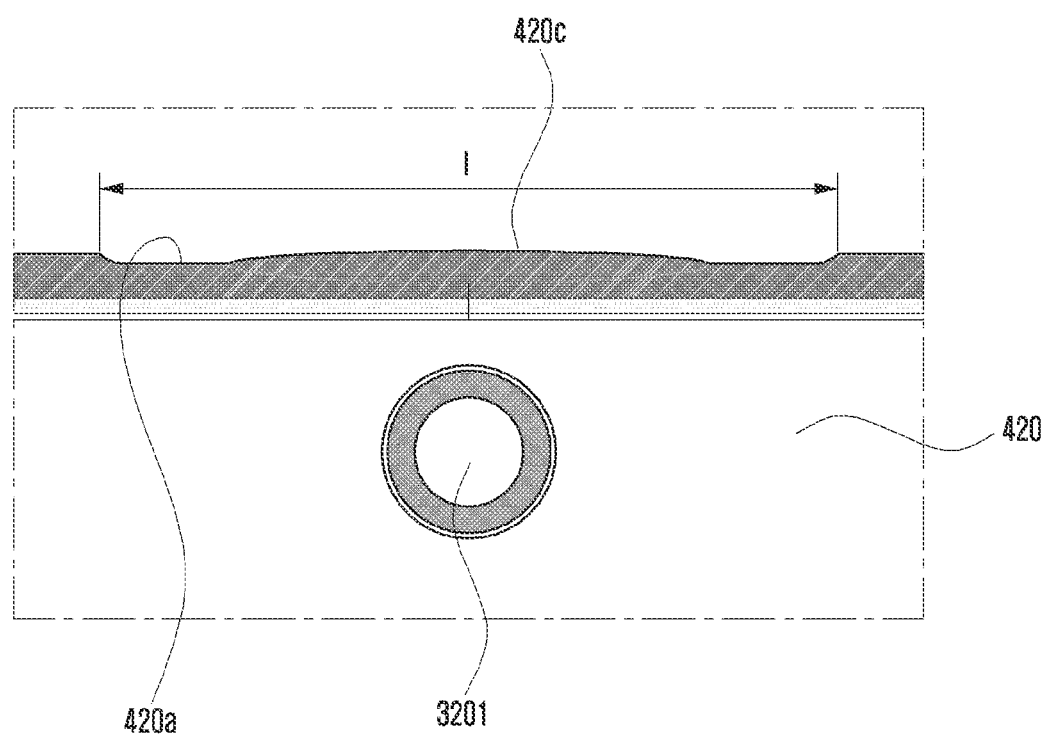

FIGS. 9A and 9B are diagrams illustrating the shape of a recess 420a in the cover member (e.g., front cover 420 in FIG. 4) corresponding to the opening (e.g., second opening 4112 in FIG. 4) according to various embodiments of the disclosure.

With reference to FIGS. 9A and 9B, the electronic device (e.g., electronic device 400 in FIG. 4) may reduce the foreign substance inflow space using at least one protrusion 420b or 420c formed in the recess 420a of the front cover 420 forming the second opening (e.g., second opening 4112 of FIG. 4). For example, the protrusions 420b and 420c may be formed within the total length 1 of the recess 420a and may be formed to not protrude more than the edge of the front cover 420. For example, the recess 420a may include a plurality of second protrusions 420b formed at regular intervals and having a planar end portion. In an example embodiment, the recess 420a may include one third protrusion 420c that does not protrude more than the edge of the front cover 420 and has an end portion in a curved shape.

Figure 10A:
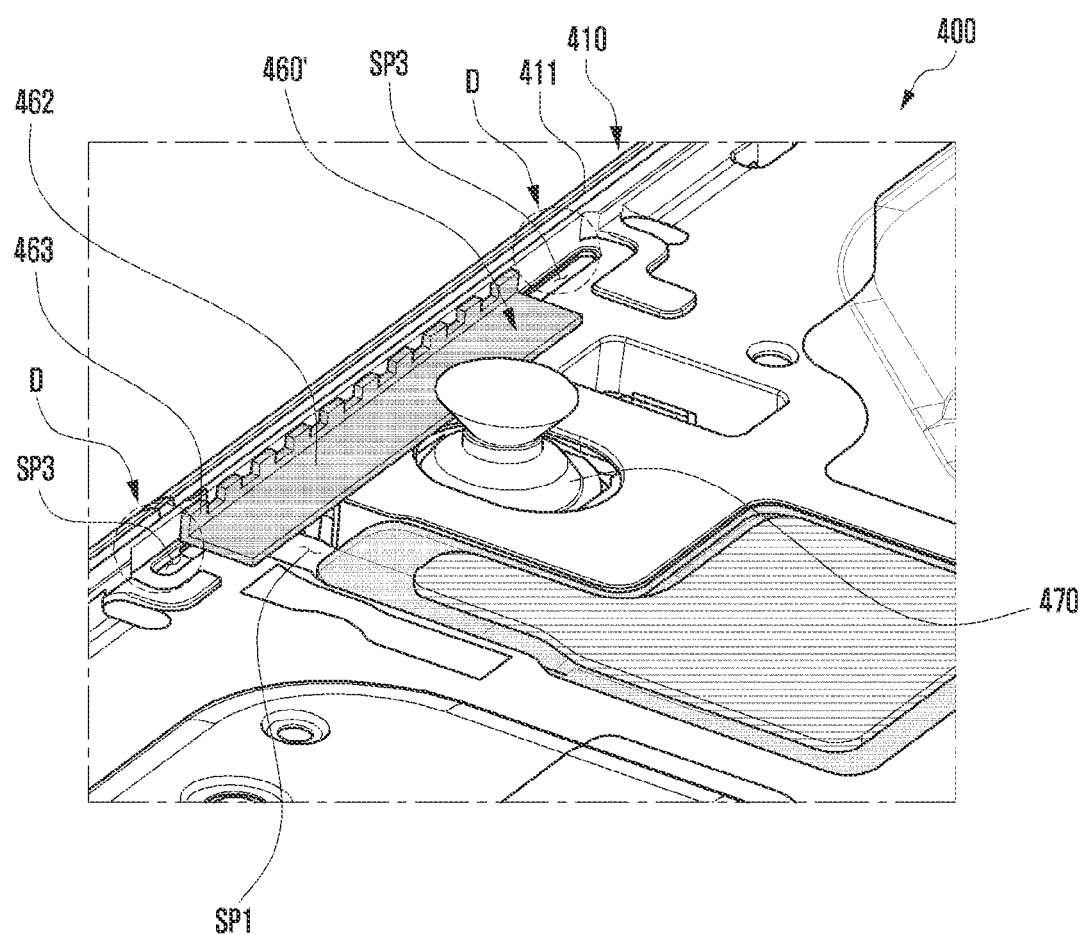
FIGS. 10A and 10B are diagrams illustrating the arrangement of a second cover applied to the third space according to various embodiments of the disclosure.
Figure 10B:
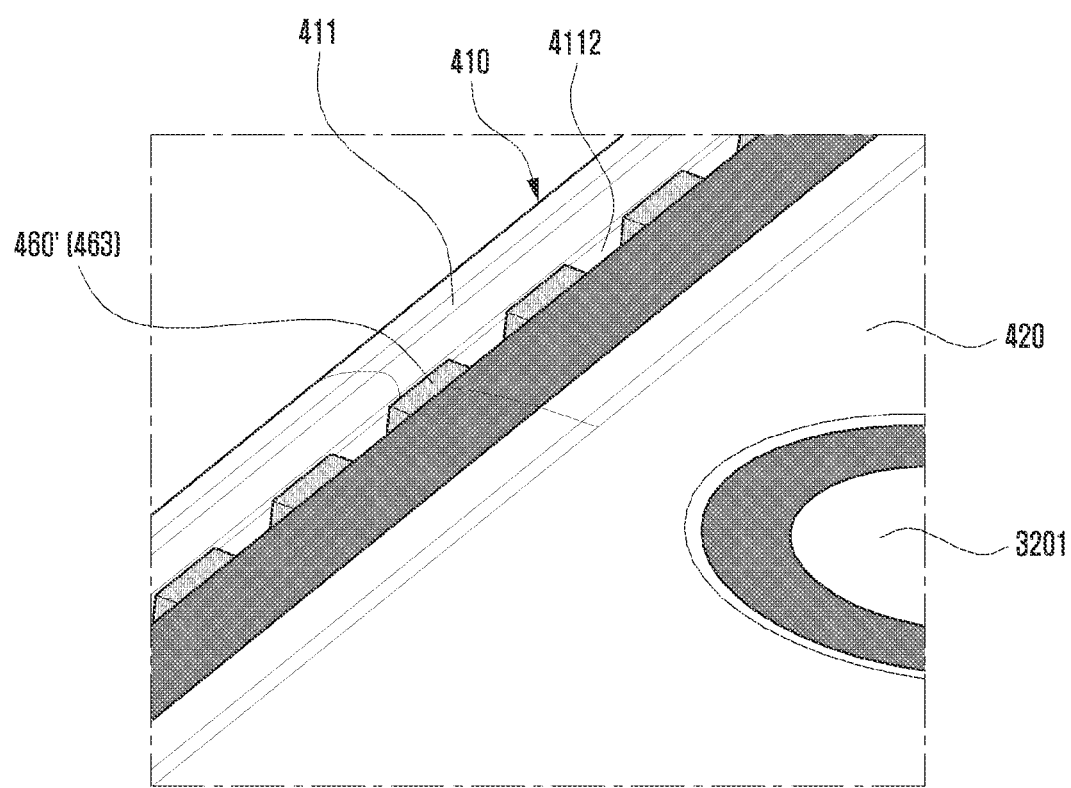

FIGS. 10A and 10B are diagrams illustrating the arrangement of a second cover 460' applied to the third space SP3 according to various embodiments of the disclosure.

With reference to FIGS. 10A and 10B, the electronic device 400 may include a second cover 460' to cover at least some of the third space SP3. In an example embodiment, the second cover 460' may include a flat part 462 to cover at least a portion of the third space SP3, and a bent part 463 that is bent in a perpendicular direction from the flat part 462 (e.g., toward the second opening 4112) and is at least partially inserted into the second opening 4112 between the side member 411 and the front cover 420. In an example embodiment, the bent part 463 may be utilized as a decorative member that is at least partially visible from the outside through the second opening 4112. In an example embodiment, the second cover 460' may include a metal material or a polymer material.

In various embodiments, the second cover 460' may be disposed to cover only a portion of the third space SP3, and the remaining portion (e.g., zone D in FIG. 10A) may be connected to the third space SP3 through the second opening 4112 and may be used as a sound emission space. In an example embodiment, the bent part 463 of the second cover 460' may shield at least a portion of the second opening 4112, helping to prevent and/or reduce the inflow of foreign substances and to secure a certain level of acoustic performance.

Figure 11:
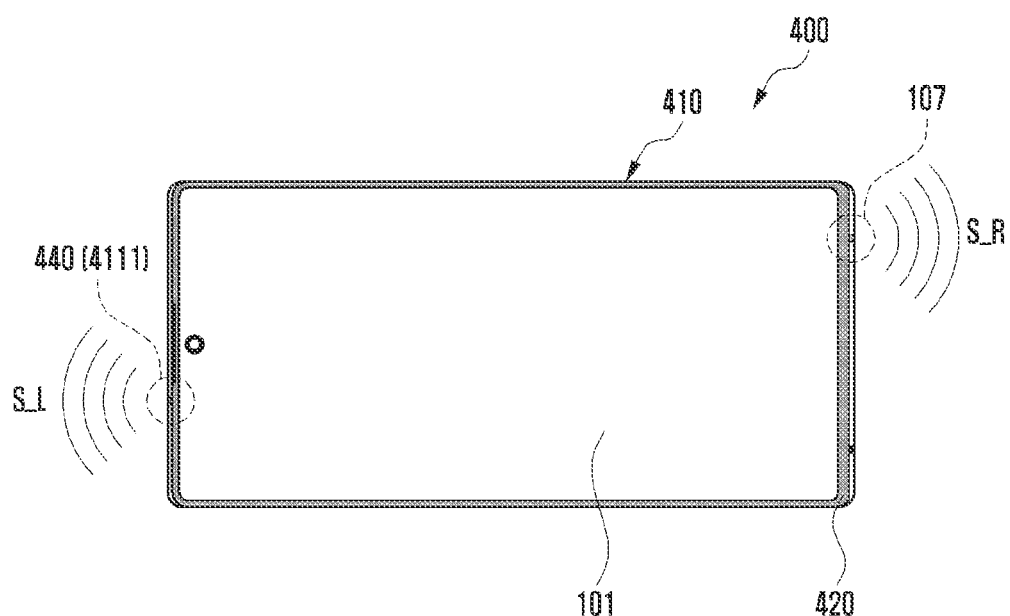
FIG. 11 is a diagram illustrating an example usage state of the electronic device according to various embodiments of the disclosure.

FIG. 11 is a diagram illustrating an example usage state of the electronic device 400 according to various embodiments of the disclosure.

With reference to FIG. 11, the electronic device 400 may include a first speaker module S_R (e.g., speaker module 107 in FIG. 1) disposed at a first position of the housing structure 410, and a second speaker module S_L (e.g., speaker module 440 in FIG. 4) disposed in a direction opposite to the first position. In an example embodiment, the electronic device 400 may perform a control operation to output sounds through the first opening 4111 formed at the upper portion of the housing structure 410 and the speaker hole 107 formed at the lower portion of the housing structure 410. In an example embodiment, the electronic device 400 may be configured to emit stereo sounds through the pair of speaker modules S_R and S_L. For example, the electronic device 400 may configure settings to emit stereo sounds through the pair of speaker modules S_R and S_L based on the content being currently played (e.g., game or video). In an example embodiment, the electronic device 400 may configure settings to emit stereo sounds through the pair of speaker modules S_R and S_L based on the current posture thereof and/or the content output to the display 101. For example, the electronic device 400 may detect that the posture is changed to landscape mode through the sensor module (e.g., gyro sensor) and may configure settings to emit stereo sounds through the pair of speaker modules S_R and S_L. As another example, the electronic device 400 may detect that the posture is changed to portrait mode through the sensor module and may configure settings to emit stereo sounds through the pair of speaker modules S_R and S_L.

According to an example embodiment of the disclosure, the path for guiding the sound signal may be applied not only to the speaker module but also to the microphone module. In another embodiment, the path structure may be at least partially applied to a sensor module detecting an environmental condition outside the electronic device, such as, for example, and without limitation, a temperature sensor, humidity sensor, odor sensor, a barometric pressure sensor, or the like.

According to various embodiments of the disclosure, it is possible to provide improved sound quality even if the opening size for sound emission is reduced owing to expansion of the display area, and it is possible to secure the reliability of the electronic device by protecting the display from a sharp tool introduced through the opening.

In various example embodiments, the electronic device (e.g., electronic device 400 in FIG. 4) may include: a housing (e.g., housing 410 in FIG. 4) including a cover (e.g., front cover 420 in FIG. 4) and at least one first opening (e.g., first opening 4111 in FIG. 4); a first acoustic module comprising a speaker (e.g., speaker module 440 in FIG. 4) disposed in the internal space (e.g., internal space 4001 in FIG. 4) of the housing; and at least one path configured to guide sound signals generated by the first acoustic module to the outside, including a first space (e.g., first space SP1 in FIG. 4) defined by the first acoustic module and at least a portion of the housing, a second space (e.g., second space SP2 in FIG. 4) connecting the first space to the first opening and configured to guide a sound signal of a first frequency band to the first opening, and a third space (e.g., third space SP3 in FIG. 4) connecting the first space to a second opening (e.g., second opening 4112 in FIG. 4) at least partially provided between the housing and the cover and configured to guide a sound signal of a second frequency band lower than the first frequency band to the second opening.

In various example embodiments, the first opening may disposed in a direction that the side of the housing faces, and the second opening may be disposed in a direction that the cover member faces.

In various example embodiments, the electronic device may further include a display (e.g., display 421 in FIG. 4) disposed at the back of the cover member to be at least partially visible from the outside through the cover.

In various example embodiments, the electronic device may include at least one electronic component (e.g., camera module 470 in FIG. 5A) disposed at the back of the display to be adjacent to the acoustic module.

In various example embodiments, the second space and the third space may be disposed to be adjacent to the at least one electronic component.

In various example embodiments, the at least one electronic component may include a camera module including a camera and/or at least one sensor module including a sensor (e.g., sensor module 480 in FIG. 5A).

In various example embodiments, the housing may include a side portion (e.g., side member 411 in FIG. 4) defining the external appearance of the electronic device, and a support (e.g., support member 412 in FIG. 4) extending from the side portion to the internal space, and the first space may be defined by a plate-shaped first cover (e.g., first cover 450 in FIG. 4) coupled to at least some of the support member.

In various example embodiments, the first opening may penetrate the side portion from the outer surface thereof to the internal space, and the second space may be connected to the first opening through the structural configuration of the side portion and the support.

In various example embodiments, the third space is disposed to cover from the first cover to the side portion and is provided using a second cover (e.g., second cover 460 in FIG. 4) coupled to the support, and the third space may be connected to the second opening defined by a gap between the side portion and the cover spaced apart from the side portion.

In various example embodiments, the second cover may include at least one sound emission hole (e.g., sound emission hole 461 in FIG. 4) configured to transmit sounds from the third space to the second opening.

In various example embodiments, the electronic device may further include a display disposed at the back of the cover member to be at least partially visible from the outside through the cover, and the side portion may further include a protruding dummy projection (e.g., protruding dummy 413 in FIG. 7) projecting toward the display.

In various example embodiments, the protruding dummy projection may protrude to at least partially overlap the cover member while maintaining a preset gap (e.g., gap d in FIG. 8) with the cover member when the cover member is viewed from above.

In various example embodiments, the third space may be provided at a preset depth below the protruding dummy to be diagonally inclined through the side portion.

In various example embodiments, the electronic device may further include a second acoustic module (e.g., speaker module 107 in FIG. 1) disposed at a position opposite to the first acoustic module in the internal space of the housing, and sound signals of the first acoustic module and the second acoustic module may be emitted in opposite directions.

In various example embodiments, the electronic device (e.g., electronic device 700 in FIG. 7) may include: a housing (e.g., housing 410 in FIG. 7) including a cover (e.g., front cover 420 in FIG. 7); a display (e.g., display 421 in FIG. 7) disposed in the internal space (e.g., internal space 4001 in FIG. 7) of the housing and at least partially visible from the outside through the cover; an acoustic module including a speaker (e.g., speaker module 440 in FIG. 7) disposed in the internal space; at least one path, configured to guide sound signals generated by the acoustic module to the outside, including a first space (e.g., first space SP1 in FIG. 4) defined by the acoustic module and at least a portion of the housing, and a second space (e.g., fourth space SP4 in FIG. 7) connecting the first space to an opening (e.g., second opening 4112 in FIG. 7) at least partially provided between the housing and the cover; and a protruding dummy projection (e.g., protruding dummy 413 in FIG. 7) projecting from the housing toward the display in the second space, wherein the protruding dummy projection may be arranged to at least partially overlap the cover when the cover is viewed from above.

In various example embodiments, the second space may be provided at a preset depth under the protruding dummy projection to be diagonally inclined through the housing.

In various example embodiments, the electronic device may further include a cover (e.g., second cover 460 in FIG. 7) disposed in the second space configured to at least partially seal the second space from the opening, and the cover may be at least partially disposed under the display.

In various example embodiments, the corresponding edge portion (e.g., second corresponding surface 4131 in FIG. 8) of the protruding dummy projection facing the edge portion (e.g., second corresponding surface 4202 in FIG. 8) of the cover may have a flat or curved surface.

In various example embodiments, the electronic device may further include an antireflective coating layer (e.g., antireflective coating layer 4132 in FIG. 8) disposed in a region of the protruding dummy projection visible through the opening.

In various example embodiments, the electronic device may include at least one electronic component disposed around the acoustic module, and the first space and/or the second space may be arranged to be adjacent to the at least one electronic component.

While various example embodiments of the disclosure have been illustrated and described with reference to the drawings, it will be understood that the various embodiments are intended to be illustrative, not limiting. It will be understood by those skilled in the art that many variations and modifications of the disclosure fall within the spirit and scope of the disclosure, including the appended claims and their equivalents.

What is claimed is:

1. An electronic device comprising:
    a lateral member forming at least a part of a lateral side of the electronic device;
    a cover at least partially disposed on the lateral member;
    an acoustic module disposed in an internal space of the electronic device;
    at least one first opening provided through at least a portion of the lateral side in the lateral member;
    a second opening provided through a space between the lateral member and the cover;
    an electronic component disposed in the internal space adjacent to the second opening; and an acoustic path configured to guide sound generated from the acoustic module to an outside through the at least one first opening and the second opening,
wherein the acoustic path includes:
   a first space at least partially disposed proximate the electronic component, when the cover is viewed from above;
   a second space that connects the first space to the at least one first opening, wherein at least part of the second space and the first space are arranged to form a first acoustic path, when the cover is viewed from above; and
   a third space that is branched from the first acoustic path to be connected to the second opening and is configured to change direction of sound from the first acoustic path toward the electronic component along the lateral member so as to bypass the electronic component, when the cover is viewed from above.

2. The electronic device of claim 1, wherein the electronic component is disposed at a top center, when the cover is viewed from above.

3. The electronic device of claim 1, comprising a separation member configured to spatially separate at least a boundary region between the first space and the second space, and to allow the sound to reach the first opening and blocks foreign substances and/or moisture from the outside.

4. The electronic device of claim 3, wherein the separation member is inclined in the boundary region.

5. The electronic device of claim 1, further comprising a display at least partially disposed in the internal space to be visible from the outside through at least a portion of the cover.

6. The electronic device of claim 5, wherein the first space is formed substantially parallel to a surface of the display.

7. The electronic device of claim 5, wherein the second space is spaced further from the display than are the first space and the third space.

8. The electronic device of claim 1, wherein the second space includes an inclined portion moving away from the cover as it goes toward the first opening.

9. The electronic device of claim 1, wherein the third space includes a portion substantially perpendicular to a surface of the cover.

10. The electronic device of claim 1, wherein a size of the at least one first opening is greater than a size of the second opening.

11. The electronic device of claim 1, wherein the electronic component includes a camera module and/or at least one sensor module.

12. The electronic device of claim 1, further comprising a display at least partially disposed in the internal space to be visible from the outside through at least a portion of the cover,
   wherein the camera module and/or at least one sensor module is disposed under the display so as to detect an external environment of the electronic device through the display and the cover.

13. The electronic device of claim 1, wherein the acoustic module includes a speaker.

14. The electronic device of claim 1, wherein:
the at least one first opening is disposed in a direction facing the lateral side of the lateral member; and
the second opening is disposed in a direction that the cover faces.

15. An electronic device comprising:
   a lateral member forming at least a part of a lateral side of the electronic device;
   a cover at least partially disposed on the lateral member;
   a speaker disposed in an internal space of the electronic device;
   a camera module, comprising a camera, disposed in the internal space;
   at least one first opening provided through a portion of the lateral side in the lateral member;
   a second opening provided through a space between the lateral member and the cover; and
   an acoustic path configured to guide sound generated from the speaker to an outside through the at least one first opening and the second opening,
wherein the acoustic path includes:
   a first space at least partially disposed proximate the camera module, when the cover is viewed from above;
   a second space that connects the first space to the at least one first opening; wherein at least part of the second space and the first space are arranged, to form a first acoustic path, when the cover is viewed from above; and
   a third space that is branched from the first acoustic path to be connected to the second opening and is configured so as to bypass the camera module, when the cover is viewed from above,
wherein more of a sound signal of a higher frequency band is to be output through the at least one first opening than through the second opening.

16. The electronic device of claim 15, wherein:
the at least one first opening is disposed in a direction facing the lateral side of the lateral member; and
the second opening is disposed in a direction that the cover faces.

17. The electronic device of claim 16, further comprising a display at least partially disposed in the internal space to be visible from the outside through at least a portion of the cover,
   wherein the camera module is disposed under the display so as to detect an external environment of the electronic device through the display and the cover.

18. The electronic device of claim 17, wherein the first space is formed substantially parallel to a surface of the display.

19. The electronic device of claim 15, wherein the second space includes an inclined portion moving away from the cover as it goes toward the first opening.

20. The electronic device of claim 15, wherein the third space includes a portion substantially perpendicular to a surface of the cover.

21. The electronic device of claim 15, wherein the sound signal output through the at least one first opening includes frequencies in the range of 800 Hz to 10000 Hz, and
   wherein, the sound signal output through the second opening includes frequencies in the range of 800 Hz or less.

22. The electronic device of claim 15, wherein the second opening is disposed between the camera module and the lateral member at a center of the electronic device, when the cover is viewed from above, and
   wherein the acoustic path is configured to guide more of sound of a lower frequency band corresponding to a human voice to be output through the second opening than through the at least one opening.

* * * * *